(12) United States Patent
Craig et al.

(10) Patent No.: US 10,661,629 B2
(45) Date of Patent: May 26, 2020

(54) METHOD AND SYSTEM FOR CONTROLLING THE TEMPERATURE IN A CABIN OF A VEHICLE WHILE THE VEHICLE ENGINE IS TURNED OFF

(71) Applicant: MAHLE International GmbH, Stuttgart (DE)

(72) Inventors: Timothy D. Craig, East Amherst, NY (US); Derek F. Klima, Clarkston, MI (US); Mingyu Wang, East Amherst, NY (US); Lawrence Wei, Royal Oak, MI (US); Edward Wolfe, IV, Clarence Center, NY (US)

(73) Assignee: MAHLE International GmbH, Stuttgart (DE)

(*) Notice: Subject to any disclaimer, the term of this patent is extended or adjusted under 35 U.S.C. 154(b) by 469 days.

(21) Appl. No.: 15/432,254

(22) Filed: Feb. 14, 2017

(65) Prior Publication Data
US 2018/0229583 A1    Aug. 16, 2018

(51) Int. Cl.
*B60H 1/00* (2006.01)
*B60H 1/32* (2006.01)

(52) U.S. Cl.
CPC ....... *B60H 1/00378* (2013.01); *B60H 1/0075* (2013.01); *B60H 1/00778* (2013.01); *B60H 1/3211* (2013.01); *B60H 2001/3261* (2013.01); *B60H 2001/3292* (2013.01)

(58) Field of Classification Search
CPC ............ B60H 1/00378; B60H 1/00778; B60H 1/0075; B60H 1/3211; B60H 2001/3292; B60H 2001/3261

USPC .......................................................... 62/161
See application file for complete search history.

(56) References Cited

U.S. PATENT DOCUMENTS

| | | | |
|---|---|---|---|
| 6,986,645 B2 | 1/2006 | Iwanami et al. | |
| 2001/0005991 A1* | 7/2001 | Niimi | B60H 1/3208 62/133 |
| 2003/0201097 A1* | 10/2003 | Zeigler | B60H 1/00378 165/240 |
| 2013/0274968 A1* | 10/2013 | Federico | B60H 1/00735 701/22 |

\* cited by examiner

*Primary Examiner* — Steve S Tanenbaum
(74) *Attorney, Agent, or Firm* — Dickinson Wright PLLC

(57) ABSTRACT

A method for controlling the temperature in a vehicle cabin, while the vehicle engine is turned off, includes the following steps: importing a State-of Charge information of a vehicle traction battery, an outside temperature, and inside temperature of the cabin into an electronic controller; calculating a normal electric power required for operating an HVAC system in a Normal mode; calculating a maximum operation time of the HVAC system in the Normal mode based on the State-of-Charge information; displaying the maximum operation time on a display; reading an operator input selecting one mode of at least the Normal mode and a first Eco mode of the HVAC system, wherein in the first Eco mode the HVAC system operates at a reduced electric power compared to the Normal mode; and operating the HVAC system in accordance with the operator input. A suitable HVAC system includes an appropriate user interface.

20 Claims, 7 Drawing Sheets

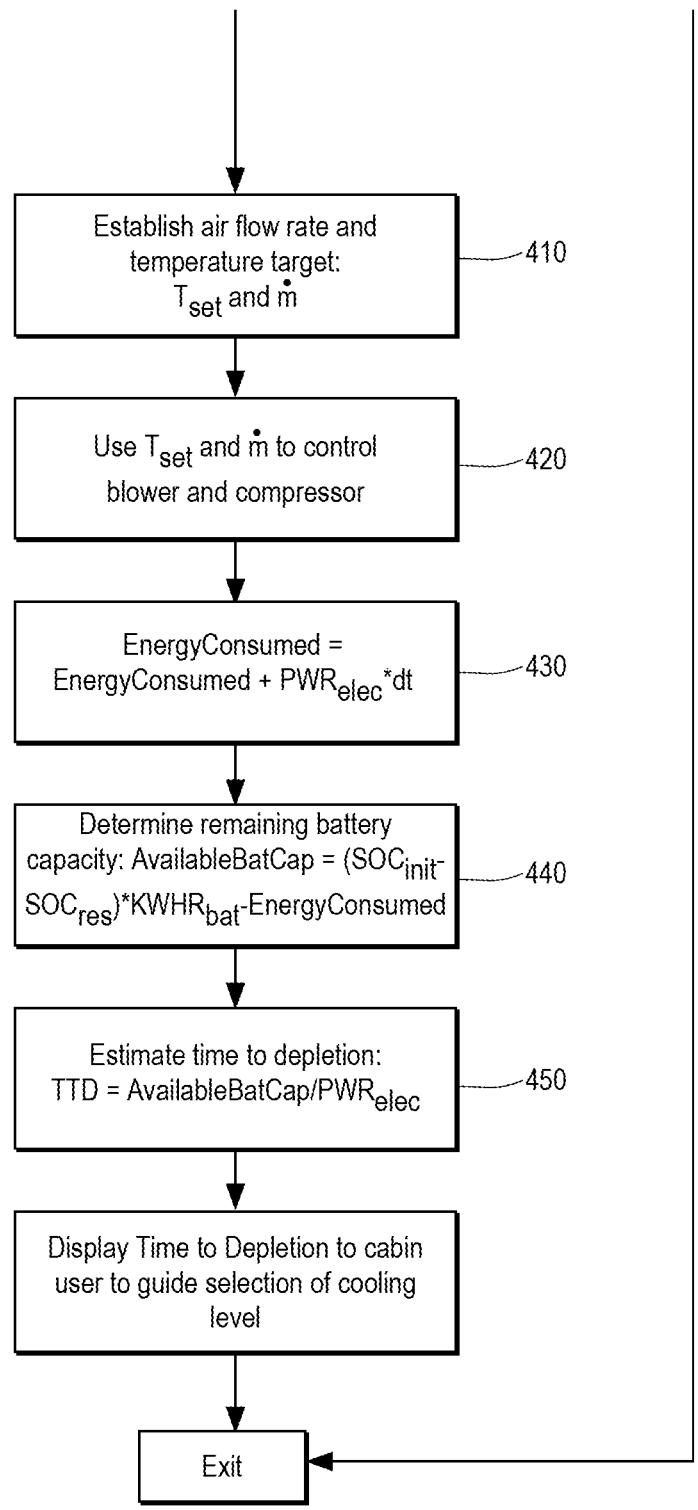

METHOD AND SYSTEM FOR CONTROLLING THE TEMPERATURE IN A CABIN OF A VEHICLE WHILE THE VEHICLE ENGINE IS TURNED OFF

TECHNICAL FIELD

The present application relates to a method and a heating, ventilation, and air-conditioning (HVAC) system for controlling the temperature in a cabin of a vehicle having a vehicle engine, while the vehicle engine is turned off, for example during rest periods while the vehicle operator is resting in the vehicle cabin.

BACKGROUND

According to National Renewable Energy Laboratory, heating and air conditioning are two of the primary reasons for operating the main engine in a long-haul truck during the driver rest period. Argonne National Laboratory calculated that in the United States, long-haul trucks (those that travel more than 500 miles per day) use 838 million gallons of fuel annually for rest period idling to provide electric energy for air-conditioning (A/C) or heating. Many states in the US have adopted anti-idling regulations to force improved fuel economy and reduced GHG emissions by prohibiting idling of the engine for extended periods of time.

However, the anti-idling regulations, together with regulations requiring regular breaks, pose a challenge to maintain cabin comfort during road-side, truck stop, or parking lot rest period for the drivers who sleep in the sleeper cabin. Alternative thermal comfort maintenance solutions are desired to provide rest period cabin comfort without idling the engine to drive the HVAC system.

Several technical solutions have been investigated to provide cabin comfort. Those include various types of Auxiliary Power Units (APU), fuel fired heaters, Adsorption A/C and Heat Pump Systems, etc., with varying degrees of success. The mainstream solution of today is to use an enlarged-capacity battery pack to provide the required electric power to drive an A/C system or electric heater for year-round comfort.

SUMMARY OF THE INVENTION

It is an object of the present application to describe an HVAC system that provides a sleeper cabin comfort control at a reasonable cost without requiring the vehicle engine to generate electric power.

According to a first aspect of the present invention, a method for controlling the temperature in a cabin of a vehicle having a vehicle engine while the vehicle engine is turned off, comprises the following steps: importing a State-of Charge information of a vehicle traction battery into an electronic controller; importing an outside temperature into the electronic control unit; importing an inside temperature of the cabin into the electronic controller; calculating a normal electric power required for operating an HVAC system in a Normal mode for performing a temperature control of the vehicle cabin to adjust the inside temperature to a target comfort temperature; calculating a maximum operation time of the HVAC system in the Normal mode based on the State-of-Charge information and the calculated normal electric power; displaying the maximum operation time in the Normal mode on a display; reading an operator input selecting one mode of at least the Normal mode of an HVAC system and a first Eco mode of the HVAC system, wherein in the first Eco mode the HVAC system operates at a reduced electric power compared to the Normal mode; and operating the HVAC system in accordance with the operator input. This informs the operator, who intend to rest in the sleeper cabin, whether the Normal mode is sustainable over the time period that the operator intends to spend in the sleeper cabin without idling the vehicle engine.

For supporting the operator in determining the best mode for the intended rest time, the method may further comprise the steps of calculating a maximum operation time of the HVAC system in the first Eco mode; and displaying the maximum operation time in the first Eco mode on the display upon selection of the first Eco mode.

The reduced electric power at which the HVAC system operates in the first Eco mode may be reduced compared to the Normal mode by a predetermined wattage, which may result in the attainable cabin temperature to be higher in a cooling operation and lower in a heating operation than in the Normal mode.

Alternatively, the reduced electric power at which the HVAC system operates in the first Eco mode is reduced compared to the Normal mode by setting a predetermined temperature difference of a target first Eco temperature relative to the target comfort temperature. In this case, if the target Normal temperature is near the inside temperature, however, the first Eco temperature is chosen as a temperature between the target comfort temperature and the inside temperature.

By providing the operator the option of selecting one of at least the Normal mode, the first Eco mode, and a second Eco mode, in which the HVAC system operates at a further reduced electric power compared to the first Eco mode, the time available for temperature control of the sleeper cabin can be further extended.

In an HVAC system that includes an HVAC evaporator and HVAC blower, the method may determine an HVAC blower speed and an HVAC evaporator outlet temperature based on the selected mode to operate the HVAC system in the selected mode at the determined HVAC blower speed and the determined HVAC evaporator outlet temperature. The HVAC blower speed and the HVAC evaporator outlet temperature may be determined by reading stored calibration information from a non-volatile memory that is obtained for the given sleeper cabin by empirical tests for optimum comfort.

The electric power required for operating the HVAC system may be further calculated based on a level of solar radiation that is present outside of the vehicle cabin, which additionally heats up the sleeper cabin.

The maximum operation time of the HVAC system in the Normal mode is preferably an operation time until the vehicle traction battery has a remaining residual charge required for starting the vehicle engine so that the operator, during the selection of the mode of operation, does not rely on electric energy that is required for starting the engine.

Generally, it may be sufficient that the State-of Charge information of the vehicle traction battery is imported only once when the method is initiated. On the other hand, the outside temperature and the inside temperature are preferably continually imported during the operation of the HVAC system in order to keep track on the environmental conditions.

For enhancing the information available to the operator, even if environmental conditions change, the display preferably displays the maximum operating time of the selected mode upon selecting the mode and the maximum operating time in the selected mode is continually updated during the operation of the HVAC system.

According to another aspect of the present invention, an HVAC system for controlling the temperature in a cabin of a vehicle with a vehicle engine while the vehicle engine is turned off, comprises a refrigeration subsystem including an electrically powered compressor, a condenser, and an expansion device; an HVAC module including a blower and an evaporator in fluid communication with the refrigeration subsystem; and an electronic controller including a user interface and at least a predetermined normal cooling power setting in a Normal mode and a predetermined reduced cooling power setting in a first Eco mode, wherein the normal cooling power setting is configured to run the compressor at a higher power consumption than the reduced cooling power setting, and wherein the normal and reduced cooling power settings are manually selectable from distinct predetermined power settings by an operator via the user interface.

For informing the operator of the maximum operation time of the HVAC system, the user interface further includes a display, wherein the electronic controller is configured to display the maximum operating time of the system on the display for a selected one of the predetermined power settings.

Preferably, the HVAC system further includes a non-volatile memory with stored calibration information pairing an evaporator power with a blower speed based on the selected one of the predetermined power settings and on environmental conditions.

Further details and benefits of the proposed method and system will become apparent from the following description of the accompanying drawings. The drawings are provided for purely illustrative purposes and are not intended to limit the scope of the present invention.

BRIEF DESCRIPTION OF THE DRAWINGS

In the drawings,

FIGS. 6A and 6B show a flow chart illustrating a method of cabin temperature control and comfort time prediction, where FIG. 6B is a continuation of FIG. 6A.

DETAILED DESCRIPTION OF THE DRAWINGS

The present application addresses two deficiencies of the prior art. One aspect is the cost of the system. With a hybrid compressor or a variable-speed brushless compressor, or with an enlarged battery, the cost of the vehicle is significantly increased while the benefit is disproportionate. Another aspect is to inform the sleeper cabin user of the State of Charge of the battery and what it means in terms of the user's comfort as well as the duration of comfort to be provided, to allow the sleeper cabin user to choose an optimal mode of operation.

The present application integrates the electrical energy use from the battery pack and provides the State-of-Charge information in real time to the sleeper cabin user. In the meantime, it teaches how to use the State-of-Charge information to predict the duration of operation at the current power consumption level. Cabin user is provided with an input method to vary the operation of the A/C system per the user's needs.

Figure 1:
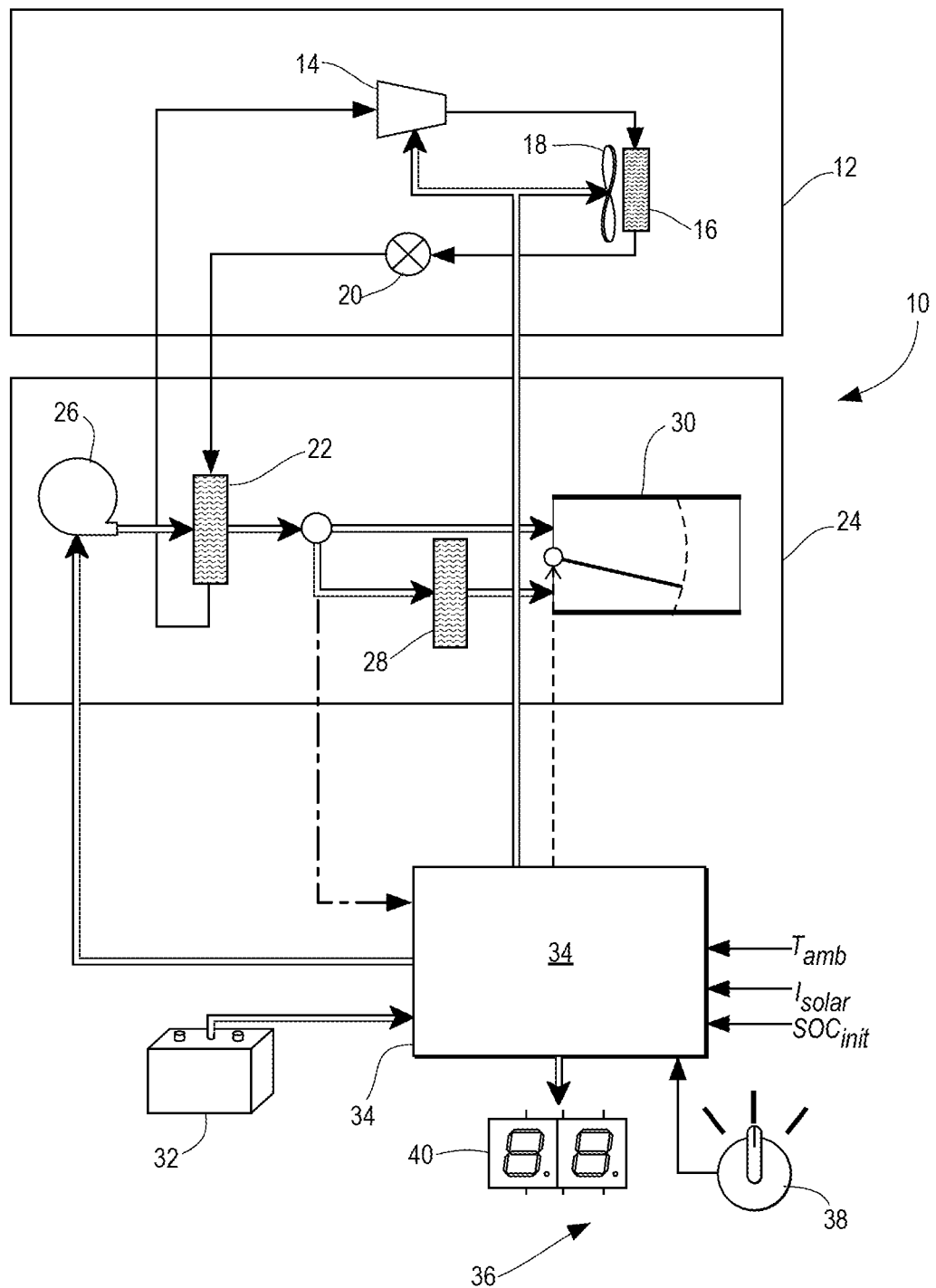
FIG. 1 shows a schematic diagram of a sleeper cabin no-idle HVAC system and control architecture.

FIG. 1 shows a proposed HVAC system 10 with a no-idle control architecture for the temperature control of a sleeper cabin. At the top is a standard refrigeration subsystem 12 composed of an electrically powered compressor 14 (which may, for example, be a fixed displacement compressor or a variable speed compressor), a condenser 16 with a condenser fan 18, and an expansion device 20. The refrigeration subsystem 12 is in fluid communication with an evaporator 22 which is located in an HVAC module 24 in the center of FIG. 1. The general principle of operation of the refrigeration subsystem 12 and the air handling system is similar to conventional systems and is not explained in greater detail.

The HVAC module 24 contains a blower 26, a heater 28, the evaporator 22, and an air mixing valve 30 to provide desired air temperature for discharge into the cabin.

The HVAC module 24 and the refrigeration subsystem 12 of FIG. 1 together form the parts of the HVAC system 10 that are operative to process the air that enters the cabin.

Depicted below the operative parts of the HVAC system 10 in FIG. 1, the HVAC system further includes a battery pack 32 as a rechargeable power supply and a control module 34 with an embedded electronic controller. The control module 34 received input information from the vehicle and associated sensors. The input information includes the State-of-Charge information $SOC_{init}$ at least at the start of the no-idle operation of the HVAC system. Further inputs include the ambient temperature $T_{amb}$ outside of the vehicle and the solar irradiation intensity $I_{solar}$. Battery power is distributed to the blower 26, condenser fan 18, and compressor 14 based on a user interface 36 to the control module 34. The user interface 36 is equipped with a user input device 38 such as buttons and knobs (physical or graphical) for selecting a mode of operation. Additionally, the user interface 36 is also equipped with a display device 40 to avail the cabin user of the system operation status information.

Figure 2:
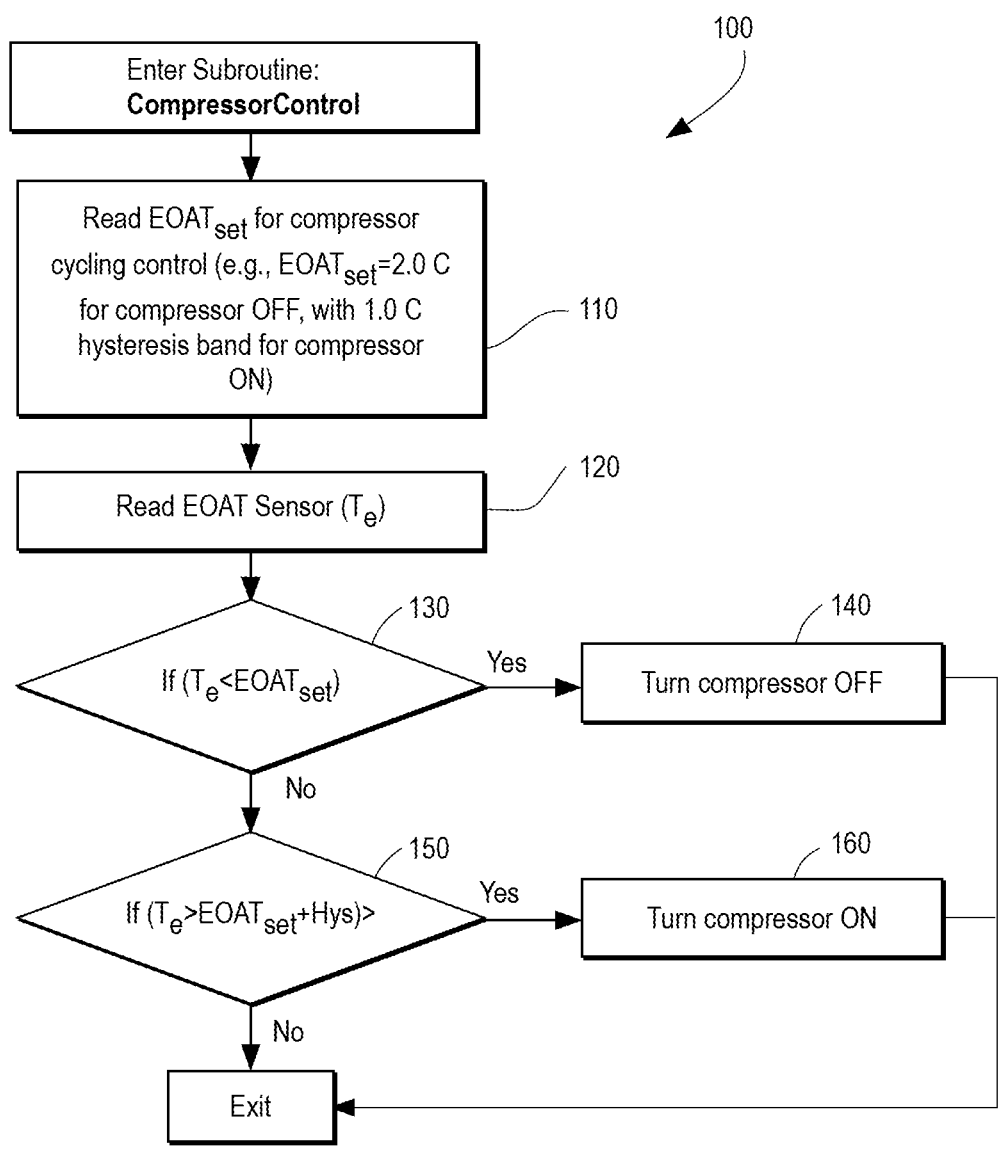
FIG. 2 shows a flow chart illustrating the control of the compressor operation.

The control of the compressor 14 to meet the requirement of air discharge into the cabin for attaining the target temperature for cooling the cabin is performed with the control method 100 of FIG. 2. This method 100 can be used either during on-road driving or off-road no-idle period. Given an air discharge temperature requirement from the evaporator 22 $EOAT_{set}$ in step 110, the actual evaporator outlet air temperature $T_e$ is read from a temperature sensor in step 120. If it is determined in step 130 that the required temperature $EOAT_{set}$ is higher than the actual temperature $T_e$, no compressor work is required, and the compressor 14 is turned off or remains turned off in step 140. If, in consideration of a hysteresis band Hys, it is determined in step 150 that the sum of the required temperature $EOAT_{set}$ and the hysteresis Hys is lower than the actual temperature $T_e$, the compressor 14 is switched on or remains switched on in step 160. For all values of $T_e$ in-between, i.e. if $EOAT_{set} \leq T_e \leq EOAT_{set}+Hys$, the compressor 14 remains in its current on or off state of operation without change. This is a traditional control method for fixed-displacement compressors known to the automotive industry. In the case that the compressor 14 is a variable speed compressor, the compressor 14 can be operated at a given, optimally selected, singly fixed ON speed under all circumstances to provide the cooling air required from the HVAC system 10 using the control method 100 of FIG. 2.

Figure 3:
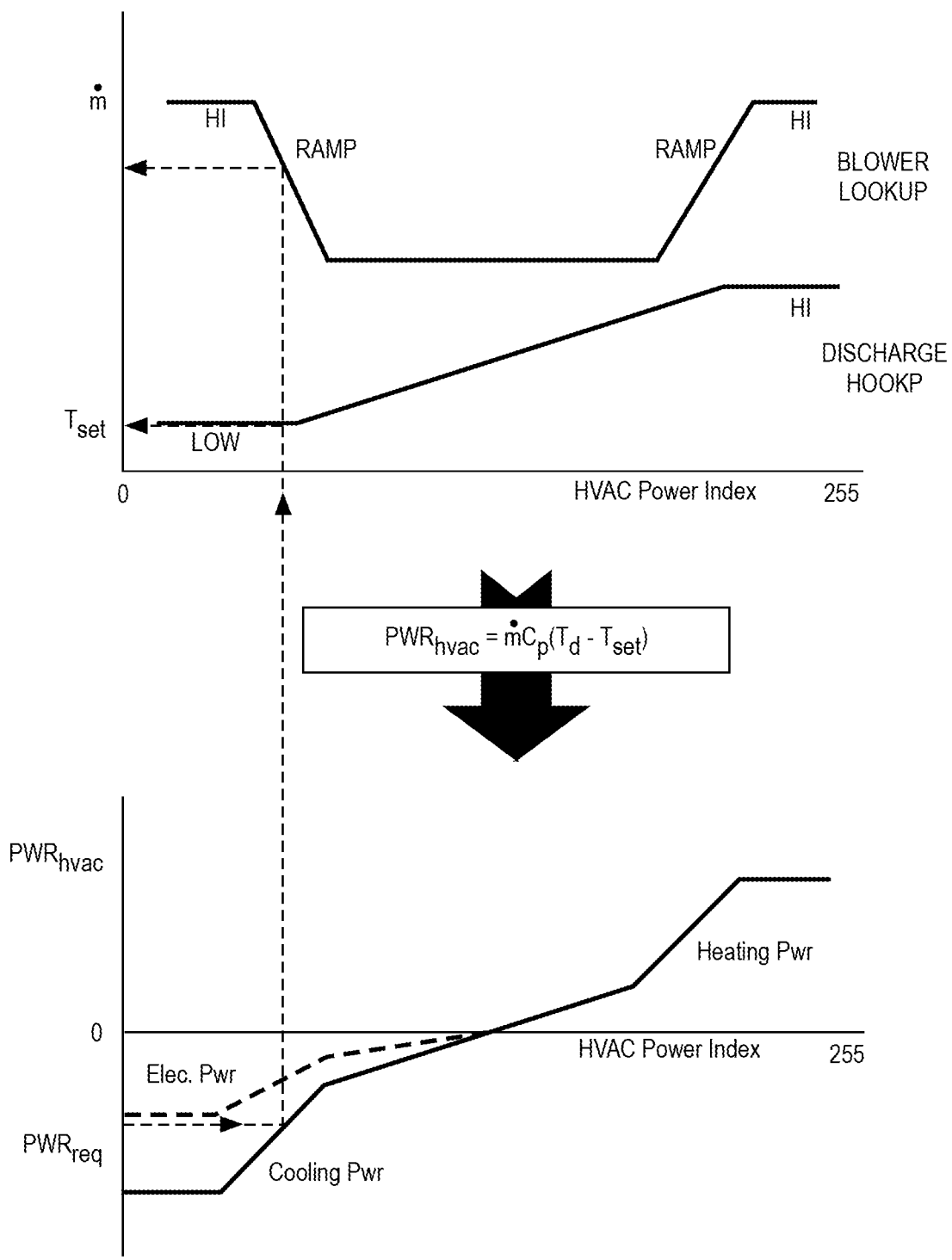
FIG. 3 shows graphs illustrating a method to determine a discharge airflow rate and an evaporator outlet temperature for cabin comfort.

FIG. 3 provides a definition of the cooling power at various combinations of discharge airflow rate and temperature. The HVAC thermal power index is an index into a table in the computer memory. The index generally negatively correlates with the ambient temperature under a given solar load. A lower index corresponds to higher ambient temperature conditions and a higher index corresponds to lower ambient conditions. The HVAC cooling or heating power is defined by the equation in the center of FIG. 3, $$PWR_{hvac} = \dot{m}C_p(T_d - T_{set})$$

with $T_{set}$ for cabin target temperature, $T_d$ for air discharge temperature from the HVAC module 24 and $\dot{m}$ for air mass flowrate from the HVAC module 24 going into the cabin. The factor $C_p$ is the specific heat of air for determining the thermal power delivered from the HVAC module and has the dimension of $$\left[\frac{J}{kg \cdot {}^\circ C.}\right].$$

In general, the HVAC thermal power represents the amount of cooling or heating enthalpy imparted to the cabin to maintain the cabin temperature at the target temperature.

Given a pair of airflow rate $\dot{m}$ and discharge temperature $T_d$ corresponding to an HVAC index, the HVAC power $PWR_{hvac}$ is calculated using the equation above when the cabin temperature is at $T_{set}$.

Proceeding through the HVAC index from the lowest values to the highest values, an entire set of airflow rate and temperature combinations are captured in the computer memory with corresponding HVAC thermal power, and ready to be used to provide control target for the blower 26 and the compressor 14. The optimal combinations of airflow rate and discharge temperature may be achieved by calibration optimization during engineering development.

It is recognized that between the Evaporator Air Out Temperature (EOAT), which is the air temperature at the outlet of the evaporator 22, and the temperature actually discharged into the cabin, a change is realized due to heat gain or loss through the ducts. However, for the sake of description, it is assumed to be the same to enhance the clarity of description.

The lower part of FIG. 3 indicates the HVAC thermal power from the airflow rate and temperature combinations from the upper part of FIG. 3. The part of the curve below the horizontal axis, which intercepts the vertical axis at 0 watts, represents negative HVAC thermal power, or cooling power. The solid line above the horizontal axis represents the positive HVAC power, or heating power. For an electric heater 28 of any genre providing heating power, the HVAC power directly corresponds to the electric power. For the cooling thermal power, however, since the Coefficient of Performance (COP) of the refrigeration subsystem 12 is greater than one, for most cases it is closer to two, the amount of input electric power to the compressor 14 is approximately half of the cooling HVAC thermal power. The electric power on the cooling side is represented by a dashed line.

With the method of FIG. 3, if it is known how much HVAC thermal power is needed to meet cabin comfort, then it is a simple matter of looking into the power table represented by the lower part of FIG. 3 to find the HVAC power index, and then going to the airflow rate and temperature tables in the upper part of FIG. 3 to read out the operational airflow rate $\dot{m}$ and discharge temperature $T_d$ to maintain comfort in the cabin by utilizing the HVAC power index having been previously determined.

Figure 4:
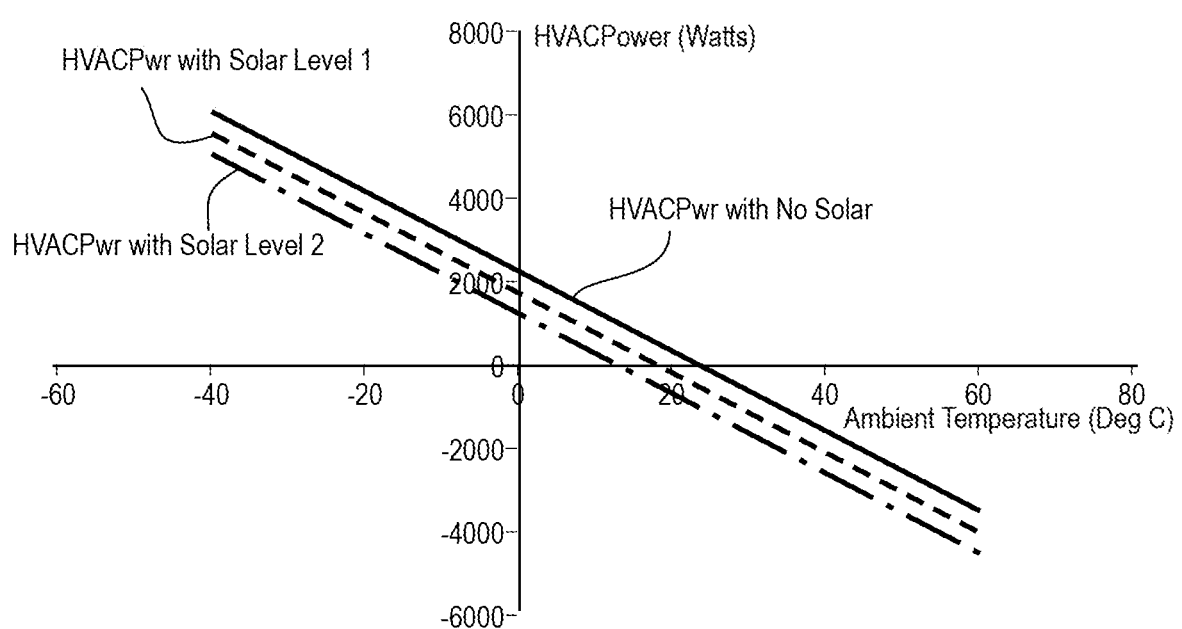
FIG. 4 shows a graph illustrating a thermal load for controlling the temperature in a sleeper cabin.

The method of determining the required HVAC thermal power, otherwise known as the cabin thermal load, is captured FIG. 4. This graph is established in the calibration process of the cabin comfort control algorithm by empirical test of a given vehicle cabin. For every ambient temperature represented in the abscissa of FIG. 4, the amount of HVAC power needed for comfort is determined in a test chamber. The solid line represents the HVAC thermal power for night time driving without solar radiation. As the solar intensity increases during daytime, the HVAC thermal power curve is shifted downward, representing a reduced heating load for winter and an increased air conditioning load for summer time.

Having this table calibrated for a particular cabin design on a given commercial truck, it is a simple matter of a table lookup to determine the HVAC thermal power requirement with the sensory inputs of an ambient temperature sensor and a solar intensity sensor positioned outside the vehicle. The so-determined HVAC thermal power can be then used along with FIG. 3 to provide the airflow rate and temperature targets for the control system.

Figure 5:
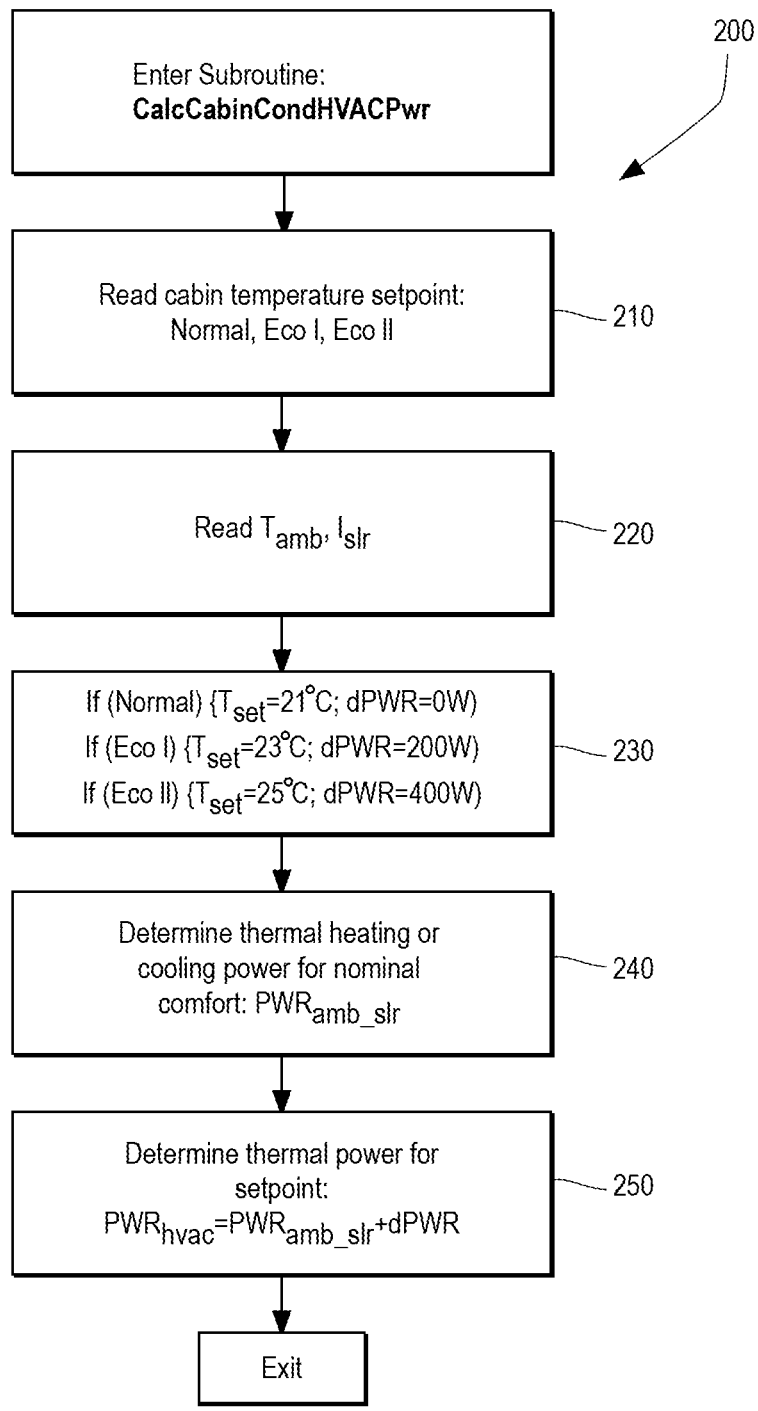
FIG. 5 shows a flow chart illustrating the determination of the thermal load for controlling the temperature in the sleeper cabin.

The process flow 200 of determining the cabin thermal load is described in the flow chart of FIG. 5 in more detail. As mentioned above, the user interface 36 to the controller will have an input device 38 in the form of a button, knob, or touchscreen selector for the cabin user to inform the controller 34 of the user's selection of one of a number of predetermined modes for cabin temperature. For example without limitation, the predetermined modes may be three modes: Normal, Eco I, and Eco II. Normal would be calibrated to provide the highest comfort automatically by the A/C system; Eco I would represent a lower energy consumption than Normal (e.g., reduced by 200 watts) in the cabin; and Eco II would consume even less energy than Eco I (400 watts below Normal). The reduced energy consumption in the Eco I and Eco II modes may not achieve cooling or heating to the comfortable temperature that is attainable in the Normal mode. For example, during cooling, the Normal mode may be able to reach and maintain a temperature of 21° C., while Eco I may only manage to reach 23° C., and Eco II only reach 25° C. If, however, the outside temperature is not much higher than the comfort temperature and if the solar irradiation is low, the temperatures attainable in the Eco I and Eco II modes may be very close to the comfort temperature. In that event, even the Normal mode would require relatively little energy and may be operable for many hours without idling the engine.

Once the user input is known in step 210, the ambient temperature $T_{amb}$ and solar irradiation $I_{solar}$ are read from the corresponding sensors in step 220. The user input is then translated into power requirements in step 230. Using the table of FIG. 4, the ambient thermal load is determined in step 240. The final cabin thermal load, or HVAC conditioning power, is obtained by offsetting the ambient-solar load with the thermal load demanded by the user via the input device 38 in step 250.

Figure 6A:
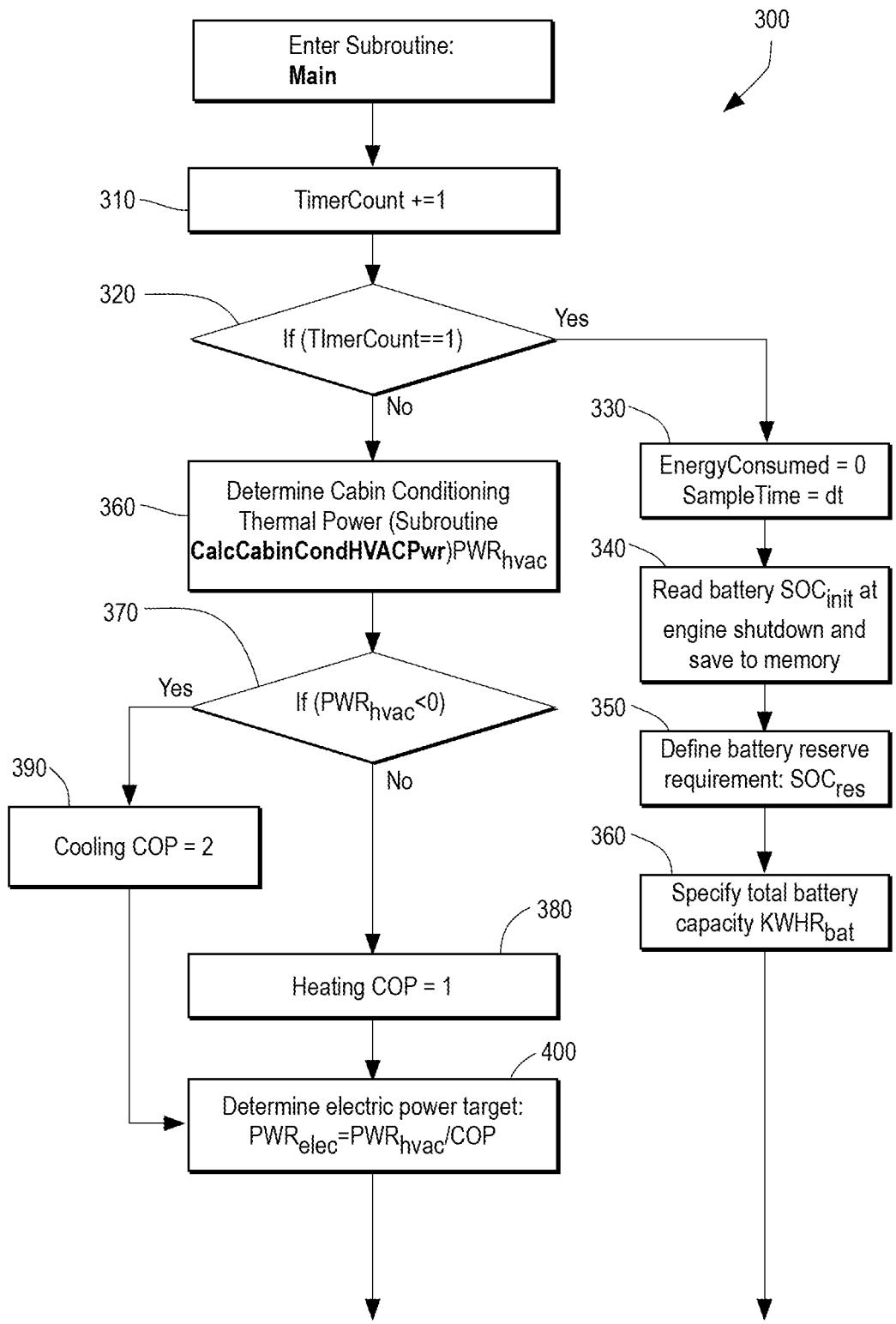

A beneficial method 300 for providing information to be displayed on the display 40 of the proposed HVAC system is contained in the flowchart of FIGS. 6A and 6B. As is well known, a control algorithm in an embedded controller is executed on a regular time cycle, such as ⅛th of a second.

A counter TimerCount is used to allow initialization and integration of battery power usage. At the first pass through the subroutine, TimerCount is set to 1 in step 310. Only if it is determined in step 320 that the TimerCount equals 1, the amount of energy consumed, recorded in the controller by EnergyConsumed variable, is initialized to 0 in step 330. Also, the time between two consecutive executions of the subroutine is set as the sampling time for integration. In the meantime, the battery State of Charge is obtained in step 340 from the vehicle's central ECU (electronic control unit) so that the HVAC controller 34 is aware of the battery charging status when the truck engine was shut down. In step 350, the required residual charge is defined in order not to deplete the battery below the charge required for starting the engine. The final piece of the information to be obtained in step 360 is the total capacity of the battery pack 32. This may be a constant number or even indexed as a function of ambient temperature and age of the battery 32.

In the subsequent execution of the subroutine, TimerCount is incremented to be greater than 1, thus bypassing the initialization steps. Now the ambient sensor and solar sensor are read and used to calculate the cabin thermal load by calling the "CabinThermalLoad" subroutine 200 of FIG. 5 in step 360. Based on the determination in step 370 whether the HVAC thermal power is to be supplied by an electric heater 28 or the refrigeration subsystem 12, a Coefficient of Performance COP is applied to determine the required electric power. The COP for heating is set to 1 in step 380, while the COP for cooling is greater than 1, here equal to 2 in step 390 without limitation. In step 400, the COP value us used to convert the thermal energy requirement into an electric power target. In step 410 shown in FIG. 6B, using the method 100 defined in FIGS. 3 and 4, the discharge airflow rate $\dot{m}$ and target output temperature $T_d$ are established. In step 420, the temperature target $T_d$ is used to control the cycling of compressor 14 by using the method described in FIG. 2, and the airflow target $\dot{m}$ is used to operate the blower 26 of the HVAC module 24.

The next step 430 in the control method 300 of FIG. 6B tracks the amount of electric energy consumed from the battery 32 by integrating the predicted electric power draw from the battery 32. It is to be noted here that the power draw in the flow chart is symbolic and simplified. The total power draw from the battery 32 may be better represented by also including the power draw from the HVAC blower 26, the condenser fan 18, and the controller 34 as well as other auxiliary electronic devices of the HVAC system or other parts of the vehicle that draw energy. This should be done in the development of the system and calibrated accurately.

Knowing the total amount of energy consumed from the start of the system, it is possible to track the amount of battery energy currently available for air conditioning in step 440. The remaining available battery energy is calculated by subtracting the initially available battery energy $SOC_{init}$ at the start of the HVAC system after engine shutdown with the EnergyConsumed up to the current time. The initial energy available in the battery 32 is determined by the initial battery charge $SOC_{init}$ and the required residual charge $SOC_{res}$ defined for engine restart so that enough residual energy is reserved in the battery 32 to allow the engine to start. The difference of the two SOC's multiplied by the total capacity of the battery 32 provides the total initial energy available for HVAC system.

Now that the current battery energy available for HVAC system is calculated, and the current power draw level is known, the total remaining operating time for the HVAC system is calculated in step 450 by dividing the battery energy available by the current power consumption level. The time remaining may then be provided to the user in step 460 through a display device 40 along with the battery state and other related information.

Accordingly, at any moment during the performance of the proposed method of controlling the HVAC system, the user can look at the display device 40 and determine how long the battery 32 will last for cabin conditioning. Depending on the user's projected sleep time, be it for example 2 hours, 4 hours, or 8 hours, the user can immediately determine whether the Normal mode, the Eco I mode, or the Eco II mode is suitable for the intended duration of the rest period. If the user intends to rest for 2 hours and the battery remaining time is 10 hours, the user can use the Normal mode to get the best comfort. On the other hand, if the user intends to rest for 8 hours, and the battery 32 remaining in the Normal mode will only last 7 hours, the user might decide to run the system in the Eco I mode to prolong the running time of the HVAC system with minimal reduction in comfort.

It is to be noted that other than the preset control settings of Normal, Eco I, Eco II modes (or any other schemes of distinguishing preset control levels), the controller may also provide a manual override for any blower level and discharge temperature level. Additionally, depending on the tolerance for complexity in the controller design, a time-dependent variable set point may be implemented to allow for an automatically changing comfort level over the course of the rest period, for example cooling the cabin to a lower temperature in the beginning to allow quick sleep, then maintaining a slightly higher temperature in a maintenance mode, and a gradually deteriorating comfort near the wake-up time. A great number of customizations may be implemented to offer better rest and conserve energy.

While the above description constitutes the preferred embodiments of the present invention, it will be appreciated that the invention is susceptible to modification, variation and change without departing from the proper scope and fair meaning of the accompanying claims.

What is claimed is:
1. A method for controlling the temperature in a cabin of a vehicle having a vehicle engine while the vehicle engine is turned off, the method comprising the following steps:
   importing a State-of-Charge information of a vehicle traction battery into an electronic controller;
   importing an outside temperature into the electronic controller;
   importing an inside temperature of the cabin into the electronic controller;
   calculating a normal electric power required for operating an HVAC system in a Normal mode for performing a temperature control of the vehicle cabin to adjust the inside temperature to a target comfort temperature;
   calculating a maximum operation time of the HVAC system in the Normal mode based on the State-of-Charge information and the calculated normal electric power;
   displaying the maximum operation time in the Normal mode on a display;
   reading an operator input selecting one mode of at least the Normal mode of an HVAC system and a first Eco mode of the HVAC system, wherein in the first Eco mode the HVAC system operates at a reduced electric power compared to the Normal mode; and
   operating the HVAC system in the one mode selected by the operator input.

2. The method according to claim 1, further comprising the steps of calculating a maximum operation time of the HVAC system in the first Eco mode; and displaying the maximum operation time in the first Eco mode on the display upon selection of the first Eco mode.

3. The method according to claim 1, wherein the reduced electric power at which the HVAC system operates in the first Eco mode is reduced compared to the Normal mode by a predetermined wattage.

4. The method according to claim 1, wherein the reduced electric power at which the HVAC system operates in the first Eco mode is reduced compared to the Normal mode by setting a predetermined temperature difference of a target first Eco cabin temperature relative to the target comfort temperature.

5. The method according to claim 4, wherein the target first Eco temperature is a temperature between the target comfort temperature and the inside temperature.

6. The method according to claim 1, wherein the operator input selects one of at least the Normal mode, the first Eco mode, and a second Eco mode, wherein in the second Eco mode, the HVAC system operates at a further reduced electric power compared to the first Eco mode.

7. The method according to claim 1, wherein the HVAC system includes an HVAC evaporator and HVAC blower, further comprising the steps of
   determining an HVAC blower speed and an HVAC evaporator outlet temperature based on the selected mode; and
   operating the HVAC system in the selected mode at the determined HVAC blower speed and the determined HVAC evaporator outlet temperature.

8. The method according to claim 7, wherein the HVAC blower speed and the HVAC evaporator outlet temperature is determined by reading stored calibration information from a non-volatile memory.

9. The method according to claim 1, wherein calculating the electric power required for operating the HVAC system is further based on a level of solar radiation that is present outside of the vehicle cabin.

10. The method according to claim 1, wherein the maximum operation time of the HVAC system in the Normal mode is an operation time until the vehicle traction battery has a remaining residual charge required for starting the vehicle engine.

11. The method according to claim 1, wherein the State-of Charge information of the vehicle traction battery is imported only once when the method is initiated.

12. The method according to claim 1, wherein the outside temperature and the inside temperature are continually imported during the operation of the HVAC system.

13. The method according to claim 1, wherein the display displays the maximum operating time of the selected mode upon selecting the mode and wherein the maximum operating time in the selected mode is continually updated during the operation of the HVAC system.

14. An HVAC system for controlling the temperature in a cabin of a vehicle with a vehicle engine while the vehicle engine is turned off, the system comprising
   a refrigeration subsystem including an electrically powered compressor, a condenser, and an expansion device;
   an HVAC module including an evaporator in fluid communication with the refrigeration subsystem and a blower; and
   an electronic controller including a user interface and at least a predetermined normal cooling power setting in a Normal mode and a predetermined reduced cooling power setting in a first Eco mode, and
   a display configured to display the maximum operation time in the Normal mode;
   wherein the normal cooling power setting is configured to run the compressor at a higher power consumption than the reduced cooling power setting,
   and wherein the normal and reduced cooling power settings are manually selectable from distinct predetermined power settings by an operator via the user interface;
   wherein the electronic controller is configured
      to receive a State-of-Charge information of a vehicle traction battery;
      to receive information on an outside temperature:
      to receive information on an inside temperature of the cabin;
      to calculate a normal electric power required for operating an HVAC system in a Normal mode for performing a temperature control of the vehicle cabin to adjust the inside temperature to a target comfort temperature;
      to calculate a maximum operation time of the HVAC system in the Normal mode based on the State-of-Charge information and the calculated normal electric power,
   to send the maximum operation time in the Normal mode to the display;
   to read an operator input selecting one mode of at least the Normal mode of an HVAC system and the first Eco mode of the HVAC system, and
   to control the HVAC system in the one mode selected by the operator input.

15. The HVAC system according to claim 14, wherein the normal power setting is equal to a power setting when the vehicle engine is in operation.

16. The HVAC system according to claim 14, wherein the reduced power setting at which the HVAC system operates in the first Eco mode differs from the normal power setting in the Normal mode by a predetermined wattage.

17. The HVAC system according to claim 14, wherein the reduced power setting at which the HVAC system operates in the first Eco mode is reduced compared to the normal power setting in the Normal mode by a predetermined temperature difference of a target cabin first-Eco temperature relative to the target comfort temperature.

18. The HVAC system according to claim 14, wherein the predetermined power settings include a second Eco mode with a further reduced power setting compared to the reduced power setting of the first Eco mode.

19. The HVAC system according to claim 14, wherein the electronic controller is configured to send a maximum operating time of the system to the display for a selected one of the predetermined power settings.

20. The HVAC system according to claim 14, further including a non-volatile memory with stored calibration information pairing an evaporator power with a blower speed based on the selected one of the predetermined power settings and on environmental conditions.

* * * * *